(12) United States Patent
Nair et al.

(10) Patent No.: US 10,467,224 B2
(45) Date of Patent: Nov. 5, 2019

(54) CENTRALIZED DATA MANAGEMENT PLATFORM

(71) Applicant: PAYPAL, INC., San Jose, CA (US)

(72) Inventors: Rahul Nair, San Jose, CA (US); Melissa Hudson-Benash, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 679 days.

(21) Appl. No.: 14/946,504

(22) Filed: Nov. 19, 2015

(65) Prior Publication Data
US 2017/0147631 A1 May 25, 2017

(51) Int. Cl.
| | | |
|---|---|---|
| G06F 16/27 | (2019.01) | |
| G06F 16/23 | (2019.01) | |
| H04L 29/08 | (2006.01) | |
| G06Q 10/00 | (2012.01) | |
| H04L 29/06 | (2006.01) | |
| G06Q 20/36 | (2012.01) | |

(52) U.S. Cl.
CPC ...... *G06F 16/2379* (2019.01); *G06F 16/2365* (2019.01); *G06F 16/27* (2019.01); *G06Q 10/00* (2013.01); *H04L 63/083* (2013.01); *H04L 67/20* (2013.01); *G06Q 20/363* (2013.01)

(58) Field of Classification Search
CPC ......... G06F 17/30371; G06F 17/30377; G06F 16/27–278; H04L 67/306; G06Q 20/363
See application file for complete search history.

(56) References Cited

U.S. PATENT DOCUMENTS

| | | | | |
|---|---|---|---|---|
| 8,972,400 B1* | 3/2015 | Kapczynski | ...... | G06F 17/30091 707/722 |
| 2002/0013827 A1* | 1/2002 | Edstrom | ......... | H04L 29/12113 709/219 |
| 2003/0074456 A1* | 4/2003 | Yeung | ................ | H04L 29/06 709/229 |
| 2004/0186901 A1* | 9/2004 | Guigui | ............. | H04L 41/0893 709/217 |

(Continued)

OTHER PUBLICATIONS

Vance, Ashlee (Jan. 10, 2010). "If Your Password Is 123456, Just Make It HackMe". The New York Times. (Year: 2010).*

(Continued)

*Primary Examiner* — Robert W Beausoliel, Jr.
*Assistant Examiner* — Nirav K Khakhar
(74) *Attorney, Agent, or Firm* — Haynes and Boone, LLP

(57) ABSTRACT

A system and/or method may be provided for publishing a user's updated account information to one or more entities. An example centralized platform system stores a plurality of central accounts of a user, where each central account corresponds with an account that the user has with another entity. The centralized platform system receives a user's updated account information associated with a central account and updates stale account information at the centralized platform system with the user's updated account information. The centralized platform system may identify a set of central accounts at the centralized platform system linked to the updated account information, identify a set of accounts that the user has with one or more other entities and that correspond with the set of central accounts, and publish the user's updated account information to the one or more entities.

20 Claims, 12 Drawing Sheets

(56) References Cited

U.S. PATENT DOCUMENTS

| | | | | |
|---|---|---|---|---|
| 2006/0047725 A1* | 3/2006 | Bramson | ............... | G06F 21/604 |
| 2007/0067309 A1* | 3/2007 | Klein, Jr. | .......... | G06F 17/30017 |
| 2007/0239722 A1* | 10/2007 | Phillips | ............ | G06F 17/30867 |
| 2013/0054454 A1* | 2/2013 | Purves | .................. | H04L 67/306 |
| | | | | 705/41 |
| 2013/0204925 A1* | 8/2013 | McDougall | ......... | H04L 67/2804 |
| | | | | 709/203 |
| 2015/0237161 A1* | 8/2015 | Young | .................. | H04L 67/306 |
| | | | | 709/204 |

OTHER PUBLICATIONS

Frye, Alan (Apr. 15, 2015)."A Bit of API History". https://www.benefitfocus.com/blogs/design-engineering/bit-api-history. (Year: 2015).*

* cited by examiner

CENTRALIZED DATA MANAGEMENT PLATFORM

BACKGROUND

Field of the Invention

The present disclosure generally relates to systems and methods for managing and publishing updated account information.

Related Art

More and more users are creating online accounts with merchants. If a user has multiple accounts with multiple merchants, it may be difficult for the user to maintain these different accounts and ensure that they have the most up-to-date information. For example, if a user moves, she may remember to update her mailing address for one online account but not another online account. The process of maintaining different online accounts and keeping them updated with correct information is a manual and tedious process. Additionally, the user may enter in the wrong information when updating an account. For example, the user may enter the wrong numeric digit when updating her account information, which can lead to an inability to use the account and/or other degradations in the user's overall experience with the account.

Figure 1:
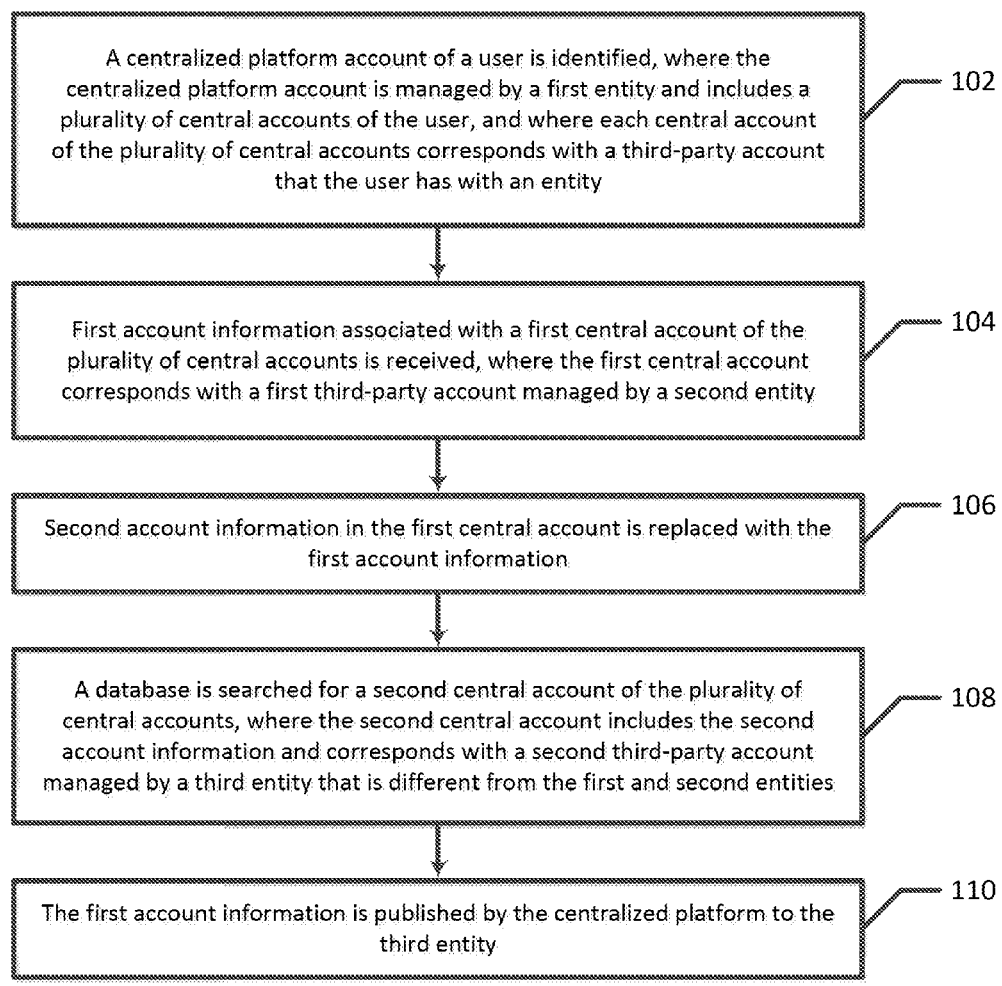
FIG. 1 is a flowchart illustrating an embodiment of a method of publishing a user's updated account information to one or more third-party entities.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

I. Overview
II. Example Method
  A. User's Centralized Platform Account
  B. Centralized Platform Receives the User's Updated Account Information
  C. Example User Interface for Updating Account Information
  D. Search for Central Accounts Linked to the Central Account or Field Modified by the User's Updated Account Information
  E. Publish the User's Updated Account Information to One or More Entities
III. Example System Architecture
IV. Example Process Flow
V. Example Computing Systems

I. Overview

The present disclosure provides techniques that allow users to easily update their account information across multiple accounts and keep it consistent across multiple websites, databases, or other account information entities. A centralized platform may store one or more centralized platform accounts of one or more users. A centralized platform account of a user includes a plurality of central accounts of the user, and each central account of the plurality of central accounts corresponds with a third-party account that the user has with an entity. The centralized platform may assist the user in integrating her third-party accounts and propagating account information between them. For example, the centralized platform may receive updated account information that updates a central account that is maintained by the centralized platform, and that also updates (or was used to update) a third-party account that the user has with an entity. The central account corresponds with the third-party account that the user has with the entity. In some examples, the user logs into and updates her account information with the centralized platform. In some examples, the user logs into the account that the user has with the third-party entity (e.g., via the entity's website) and updates her account information with the entity.

The centralized platform updates the central account with the user's updated account information. Rather than have the user manually update all of her third-party accounts, the centralized platform may assist the user by publishing the user's updated account information to one or more other third-party entities with which the user has an account. The third-party entity may receive the user's updated account information and update its own record of the user's account accordingly. If the user logged into the centralized platform and updated a central account with the user's updated account information, the centralized platform may identify the third-party account corresponding with this central account and publish the user's updated account information to the third-party entity that manages the corresponding account. Additionally, the centralized platform may publish the user's updated account information to one or more third-party entities that are linked to this central account. Accordingly, the user may be less burdened due to the system eliminating the need to provide the same updated account information to multiple entities.

Unless specifically stated otherwise, as apparent from the following discussion, it is appreciated that throughout the description, discussions utilizing terms such as "receiving", "sending", "storing", "identifying", "determining", and "replacing", "searching," "publishing," "linking," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

II. Example Method

FIG. 1 is a flowchart illustrating an embodiment of a method 100 of publishing a user's updated account information to one or more third-party entities. Method 100 is not meant to be limiting and may be used in other applications other than those discussed below. Method 100 includes blocks 102-110.

A. User's Centralized Platform Account

In a block 102, a centralized platform account of a user is identified, where the centralized platform account is managed by a first entity and includes a plurality of central accounts of the user, and where each central account of the plurality of central accounts corresponds with a third-party account that the user has with an entity. The user may log into the centralized platform and provide her user credentials. Based on the user credentials, the centralized platform may identify the user's centralized platform account. From the perspective of the centralized platform, an account is a third-party account if the account is maintained and controlled by an entity that is not the centralized platform.

The centralized platform may include one or more centralized platform accounts of one or more users. An account that the user has with the centralized platform may be referred to as a centralized platform account, and an account included in the centralized platform account may be referred to as a central account. The centralized platform assists the user in managing a plurality of third-party accounts that the user has with entities other than the centralized platform. Each third-party account may include account information associated with consumers, merchants, and funding sources, such as credit card companies. Account information may include private and/or biographical information of users such as account numbers, passwords, device identifiers, user names, phone numbers, credit card information, bank information, or other information, which may be used to facilitate online transactions by users.

To open an account with an entity, the user provides the entity with biographical information such as the user's name, birthdate, mailing address, etc. The entity may store the user's personal information and include it in the user's account. In some examples, the entity is a "source of truth" that provides the user with a service (e.g., credit card or banking services) and generating identifying information associated with the service. In an example, the entity is a credit card company that provides the user with a credit card for purchasing goods and services. In such an example, the entity provides the user with a credit card number that uniquely identifies the user's credit card account along with associated information (e.g., credit card expiration date or card verification value code (CVV)). The credit card company maintains an account for the user including account information such as the user's name, birthday, mailing address, credit card number, credit card expiration date, and/or CVV, etc. In another example, the entity is a bank that provides the user with banking services. In such an example, the entity provides the user with a checking account number that uniquely identifies the user's checking account with the bank along with associated information (e.g., routing number). The bank may also provide the user with a debit card and a debit card number that uniquely identifies the user's debit card account and is linked with the user's checking account. The bank maintains an account for the user including account information such as the user's name, birthday, mailing address, checking account number, debit card number, etc.

In some examples, the entity is a merchant that sells goods and/or services to the user and maintains account information associated with the user. In an example, the entity is an online merchant that accepts payment from the user via a funding source (e.g., the user's credit card number and/or checking account number). In such an example, the entity may maintain an account for the user including account information such as the user's name, birthday, mailing address, and one or more funding sources used to make a purchase with the merchant.

The centralized platform may be a link between two third-party entities (e.g., a source of truth and a merchant). The user may have a plurality of accounts set up and maintained by a plurality of entities (e.g., the credit card company, bank, merchants, etc.). To have a central location at which to manage these accounts, the user may have a centralized platform account with the centralized platform. The centralized platform may assist the user in integrating her plurality of third-party accounts and "sit" between them. For the user, the process of updating her information may be streamlined with the use of the centralized platform. For example, the user may provide updated account information to the centralized platform, which may then publish the user's updated account information to one or more third-party entities with which the user has an account. A third-party entity that receives the updated account information may then search for its record of the user's account and update the information in the user's account accordingly. Additionally, the centralized platform may allow the user to set up rules regarding how she would like to manage her personal and financial account information. For example, the centralized platform may provide a capability for mapping account information from the source of truth (e.g., the user's online banking profile or online credit card profile) to various websites.

In an example, the user has a first account with a credit card company, a second account with a bank, and a third account with a merchant. Each of these entities may maintain its own record of the user's account and have different information from each other at any given time. In such an example, the user's centralized platform account may include a first central account corresponding with the user's credit card account with her credit card company, a second central account corresponding with the user's debit card account with her bank, and a third central account corresponding with an account that the user has with the merchant.

An entity that maintains a user's account maintains and controls the information in the account. An account may include fields and field values that correspond to the fields. For example, a field may be a "mailing address" and the field value that corresponds to this field may be "123 Main Street." The user may desire to update central account information in the user's central account and have these changes propagated to one or more third-party entities with which the user has an account. For example, if the user has moved and now has a different mailing address, the user may desire to update her mailing address, which was originally "123 Main Street," to "456 Acme Street" for one or more of the accounts that the user has with other entities.

B. Centralized Platform Receives the User's Updated Account Information

In a block 104, first account information associated with a first central account of the plurality of central accounts is received, where the first central account corresponds with a first third-party account managed by a second entity. A central account corresponding with a third-party account that the user has with an entity is based on the information in the user's account with the entity. If the user updates her account with an entity, the user's corresponding central account should be updated similarly. Likewise, if the user updates a central account, the user's corresponding third-party account with an entity should be updated similarly. In a block 106, second account information in the first central account is replaced with the first account information. The first account information may be updated account information for the first central account and may be an updated value of any field (e.g., mailing address, credit card expiration number, e-mail address, or checking account number) listed in the user's central account or the user's account, including blank field values. The second account information may be account information that the first entity currently has stored for the user. The information that the first entity currently has stored for the user may be stale information that the user is attempting to update.

The centralized platform may receive the first account information associated with the first central account in a variety of ways. In some examples, the centralized platform provides the user with a user interface in which to enter the updated account information and update one or more of the user's central accounts. The user logs into the centralized platform and is provided with a webpage in which to enter her updated account information. In such an example, the user may manually enter her updated account information via the webpage provided by the centralized platform.

C. Example User Interface for Updating Account Information

Figure 2:
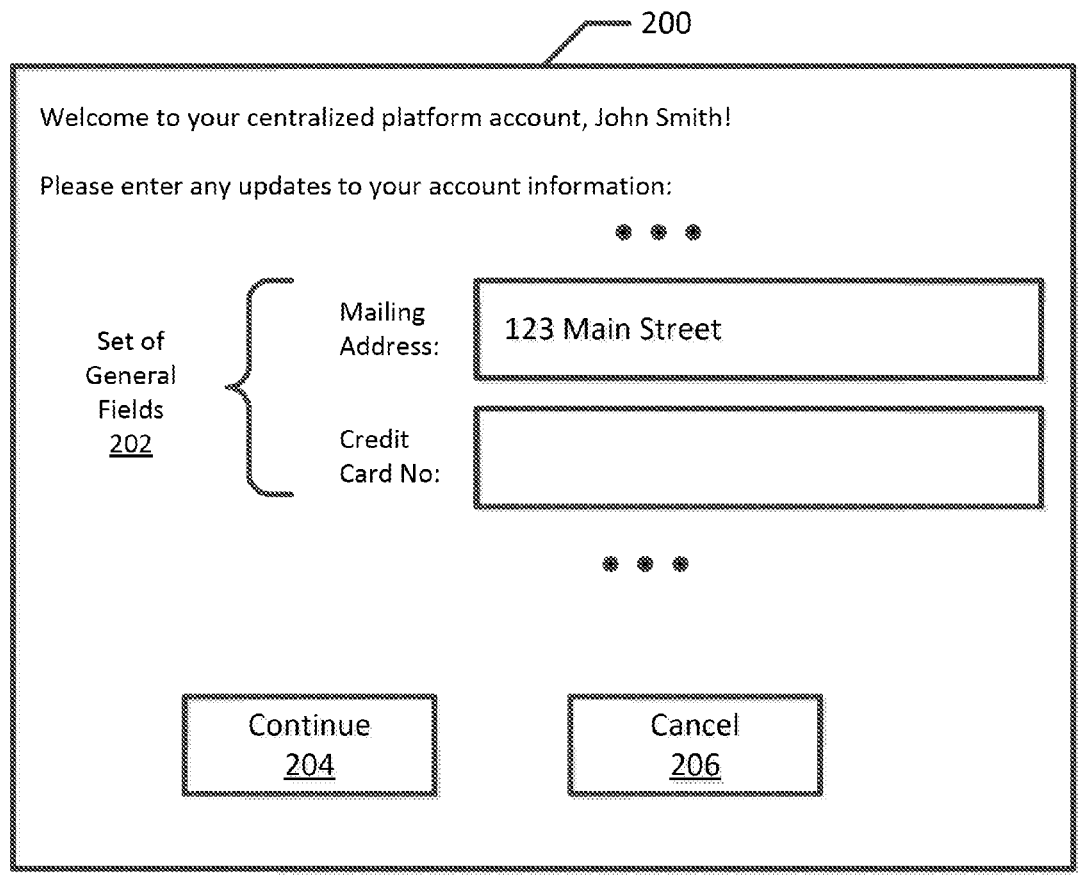
FIG. 2 is an embodiment of a webpage provided by the centralized platform to the user to update central account information in the user's centralized platform account.

For simplicity and brevity, the first account information is illustrated as being the user's updated mailing address. It should be understood that one of skill in the art in possession of the present disclosure will recognize that a wide variety of fields and field values stored in the user's third-party and/or central account may be updated and will fall within the scope of the present disclosure. FIG. 2 is an embodiment of a webpage 200 provided by the centralized platform to the user to update central account information in the user's centralized platform account. In FIG. 2, the user's centralized platform account may include a set of general fields 202 (e.g., mailing address, credit card no, etc.) into which the user may enter updated account information, and one or more of the set of general fields 202 may correspond with one or more fields of the user's central account or third-party accounts. The set of general fields 202 may be one or more popular fields that users update relatively often. The "mailing address" field of set of general fields 202 has the field value "123 Main Street." If the user enters "456 Main Street" into the "mailing address" field on webpage 200 and selects a user selectable option "Continue" 204, the centralized platform receives the user's updated mailing address "456 Main Street" and updates the user's central account information in one or more of the user's central accounts, which is maintained by the centralized platform. Alternatively, the user may select a user selectable option "Cancel" 206 indicating to the centralized platform that the user does not wish to update any of her account information in her centralized platform account at this time.

Figure 3:
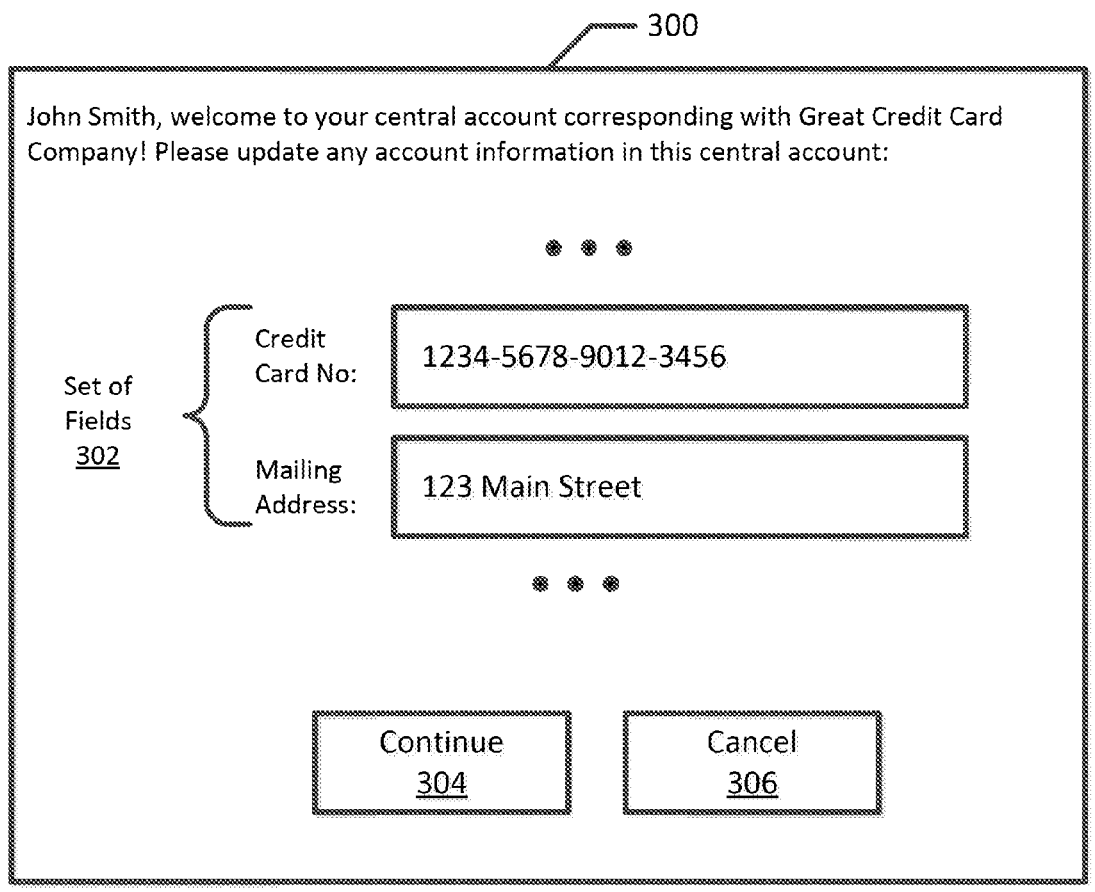
FIG. 3 is an embodiment of a webpage provided by the centralized platform to the user to update central account information in the user's central account.

FIG. 3 is an embodiment of a webpage 300 provided by the centralized platform to the user to update central account information in the user's central account. Webpage 300 is specific to a central account corresponding with a third-party account that the user has with an entity. The user may log into the centralized platform and navigate to webpage 300, which allows the user to modify central account information in a particular central account of the user. In the example illustrated in FIG. 3, the central account that is specific to webpage 300 corresponds with the user's account with the Great Credit Card Company, which is a credit card company that provides the user with a credit card (e.g., credit card number 1234-5678-9012-3456). Webpage 300 includes a set of fields 302 into which the user may enter updated account information to store in the user's central account corresponding with the Great Credit Card Company. The user may update one or more fields of set of fields 302. The account information entered into the "credit card no" and "mailing address" fields on webpage 300 may be maintained by the centralized platform and correspond with account information that is separately maintained by the Great Credit Card Company. The "mailing address" field of set of fields 302 has the field value "123 Main Street." If the user enters "456 Main Street" into the "mailing address" field on webpage 300 and selects a user selectable option "Continue" 304, the centralized platform receives the user's updated mailing address "456 Main Street" and updates the central account. Alternatively, the user may select a user selectable option "Cancel" 306 indicating to the centralized platform that the user does not wish to update any of her account information in the central account at this time.

In some examples, the centralized platform receives the updated account information from a third-party entity with which the user has an account. For example, the user may log into the third-party entity's website by providing her user credentials. The third-party entity may identify the user's account based on her user credentials and provide the user with a webpage in which to update her account information. In such an example, the user may manually enter her updated account information via the webpage provided by the third-party entity's website.

Figure 4:
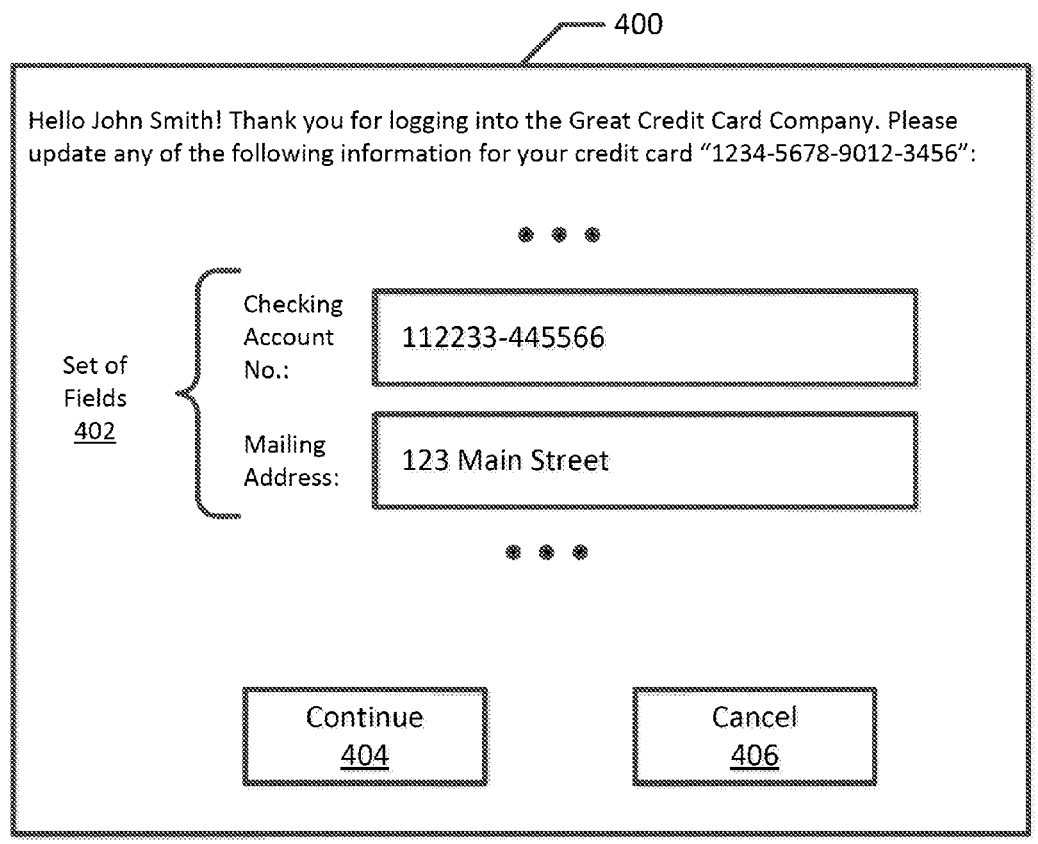
FIG. 4 is an embodiment of a webpage provided by an entity to the user to update the user's account with the entity.

FIG. 4 is an embodiment of a webpage 400 provided by an entity to the user to update the user's account with the entity. The user may log into the entity's website and be provided with webpage 400, which displays a set of fields 402 into which the user may enter information. Webpage 400 may be provided by Great Credit Card Company, and one or more fields of set of fields 402 may correspond with one or more fields of set of fields 302 (see FIG. 3) in the central account corresponding with the Great Credit Card Company or may correspond with one or more fields of set of general fields 202 (see FIG. 2) provided by the centralized platform. For example, the "mailing address" field on webpage 400 may correspond with the "mailing address" field on webpage 300 or webpage 200. Additionally, the credit card number "1234-5678-9012-3456" listed in set of fields 302 on webpage 300 is the same as the credit card number listed in the user's account with the Great Credit Card Company on webpage 400.

In FIG. 4, the "mailing address" field of set of fields 402 has the field value "123 Main Street." If the user enters "456 Main Street" into the "mailing address" field on webpage 400 and selects a user selectable option "Continue" 404, the entity receives the user's updated mailing address "456 Main Street" and may update its record of the user's account. At this point, the user's account with the entity has been updated, but not the user's corresponding central account maintained by the centralized platform. The centralized platform may maintain the updated account information entered into webpage 200 or webpage 300 separately from the Great Credit Card Company. For example, if a user enters information into webpage 300, it may or may not be provided to the Great Credit Card Company. Likewise, the Great Credit Card Company may maintain the updated account information entered into webpage 400 separately from the centralized platform. For example, if a user enters information into webpage 400, it may or may not be provided to the centralized platform. Each of these entities stores and maintains its own data for its own accounts or central accounts with the user.

The entity may push this updated account information to the centralized platform. In this way, the centralized platform may receive the user's updated account information. In some examples, the centralized platform publishes a set of application programming interfaces (APIs) that allows an entity (e.g., a website) to integrate into the centralized platform. In such an example, the entity may pass the user's account information maintained by the entity to the centralized platform for storage by invoking one or more APIs of the set of APIs. Accordingly, websites may use the set of APIs provided by the centralized platform to integrate with and share account information with it as well as each other. The entity may invoke one or more APIs of the set of APIs published by the centralized platform and pass the user's updated account information (e.g., the mailing address "456 Main Street") to the centralized platform for storage in the user's central account via the invoked API(s).

D. Search for Central Accounts Linked to the Central Account or Field Modified by the User's Updated Account Information Referring back to FIG. 1, in a block 108, a database is searched for a second central account of the plurality of central accounts, where the second central account includes the second account information and corresponds with a second account managed by a third entity that is different from the first and second entities. The database is coupled to the centralized platform and stores central account information corresponding with the plurality of third-party accounts that the user has with the entities. In some examples, the centralized platform searches for central accounts of the plurality of central accounts that have the same field(s) that is/are updated by the first account information received by the centralized platform (e.g., the user's updated account information). For example, the centralized platform may search for central accounts of the plurality of central accounts having a mailing address field.

In some examples, the centralized platform provides the user with an option to link one or more first central accounts or first central account fields with one or more second central accounts or second central account fields. The user may link a first central account corresponding with a credit card account with a second central account corresponding with a merchant account that the user has with a merchant because the credit card company provides incentives (e.g., "double points back" on purchases from the merchant). In another example, the user may link a mailing address field with a plurality of central accounts having a mailing address field (e.g., an account that the user has with the United States Postal Service). The centralized platform may search for any central accounts that are linked with the field or central account that was modified by the updated account information.

Figure 5:
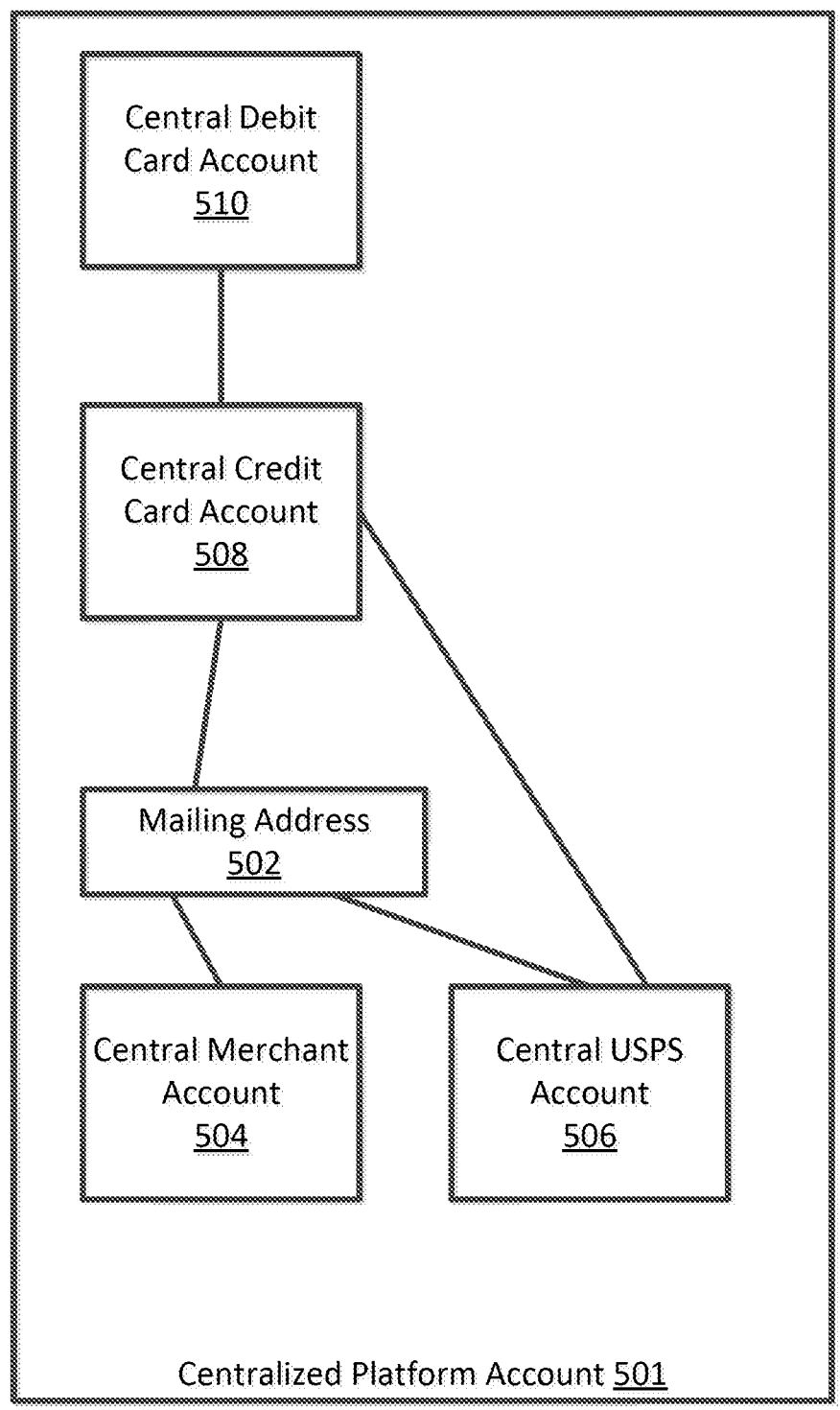
FIG. 5 is an block diagram illustrating an embodiment of linked central accounts and fields in a centralized platform account of the user.

FIG. 5 is a block diagram illustrating an embodiment of linked central accounts and fields in a centralized platform account 501 of the user. In FIG. 5, centralized platform account 501 includes a central merchant account 504, a central USPS account 506, and a central credit card account 508, each of which includes a mailing address field. A mailing address field 502 is linked with central merchant account 504, central USPS account 506, and central credit card account 508. In this example, if the user updates her mailing address, centralized platform may search a database for central merchant account 504, a central USPS account 506, and a central credit card account 508 because these central accounts are linked with mailing address field 502. Additionally, central credit card account 508 is linked with a central debit card account 510 and central USPS account 506. In this example, if the user updates account information in central credit card account 508, centralized platform may search a database for central USPS account 506 and central debit card account 510. Likewise, if the user updates account information in central USPS account 506, centralized platform may search a database for central credit card account 508 and central debit card account 510. It should be understood that other central accounts and fields in centralized platform account 501 may be linked.

E. Publish the User's Updated Account Information to One or More Entities

In a block 110, the first account information is published by the centralized platform to the third entity. Before the centralized platform publishes the first account information to the third entity, the centralized platform may ask the user for approval to do so. In this way, the user may be alerted that account information associated with the user has been updated. The centralized platform may provide the user with transaction information about the updated account, such as the date and time the update was requested, where the update was requested (e.g., the location of the browser that requested the update or the website to which the request was made), etc. However, in some embodiments, a user may pre-authorize the updating of account information between accounts such that when one or more accounts are updated with new account information, the pre-authorized accounts are updated with that new account information as well.

In response to a determination that the first account information has been approved for publishing to the third entity, the centralized platform publishes the first account information to the third entity. The centralized platform may publish the first account information to the third entity by sending the first account information over a network to the third entity (e.g., to the third entity's website). The third entity may receive the first account information and update its record of the user's account accordingly. For example, if the third entity stores the user's old mailing address "123 Main Street," the third entity may update the user's mailing address to "456 Acme Street" and thus have the user's most up-to-date mailing address. Accordingly, one update to the user's central account at the centralized platform may result in one or more third-party entities being aware of the updated information. A third-party entity may then update its own record of the user's account. Additionally, to maintain consistency between a central account and its corresponding third-party account, if the user approves (or has pre-approved) the first account information being published to the third entity, the centralized platform may also update the central account corresponding with the third-party account.

In some examples, merchant entity 626 sends a confirmation that the user's mailing address with the merchant entity has been updated to centralized platform 604. In response to the confirmation from merchant entity 626, centralized platform 604 may update central account 610B, which corresponds with third-party account 624 that the user has with merchant entity 626.

In contrast, in response to a determination that the first account information has been rejected by the user for publishing to the third entity, the centralized platform does not publish the first account information to the third entity. The user may modify the settings of her centralized platform account to instruct the centralized platform to always ask the user for approval before publishing updated information to a subset of entities or to all applicable entities or, as discussed above, to instruct the centralized platform to automatically publish the updated account information to a subset of entities or to all applicable entities that store account information that would be updated.

As such, the user may update particular account information once and publish the update to multiple entities, thus saving time. For example, based on the centralized platform receiving the user's updated mailing address once, the centralized platform may publish the user's updated mailing address to multiple third-party entities. Referring back to FIG. 2 and FIG. 3, the user may make changes to her central account with the centralized platform, and these changes may be propagated to third-party entities with which the user has an account. Referring to FIG. 4, the user may make changes to her account with an entity by providing the updated information to the entity (e.g., via the entity's website), and these changes may be propagated to the centralized platform, which may publish the updated account information to third-party entities with which the user has an account.

Although the disclosure may describe one field or one central account being updated based on receiving updated account information of a user, it should be understood that information associated with more than one field and/or more than one central account may be updated and received by the centralized platform. Additionally, one of skill in the art in possession of the present disclosure will recognize that a wide variety of fields and field values included in a central account may be updated and fall within the scope of the present disclosure. For example, other account information that may be updated are the user's credit card number, member identifier, residence address, telephone number, and e-mail address, username, and/or virtually any other user-identifying or user-associated information known in the art.

It is understood that additional processes may be performed before, during, or after blocks 102-110 discussed above. It is also understood that one or more of the blocks of method 100 described herein may be omitted, combined, or performed in a different sequence as desired.

III. Example System Architecture

Figure 6:
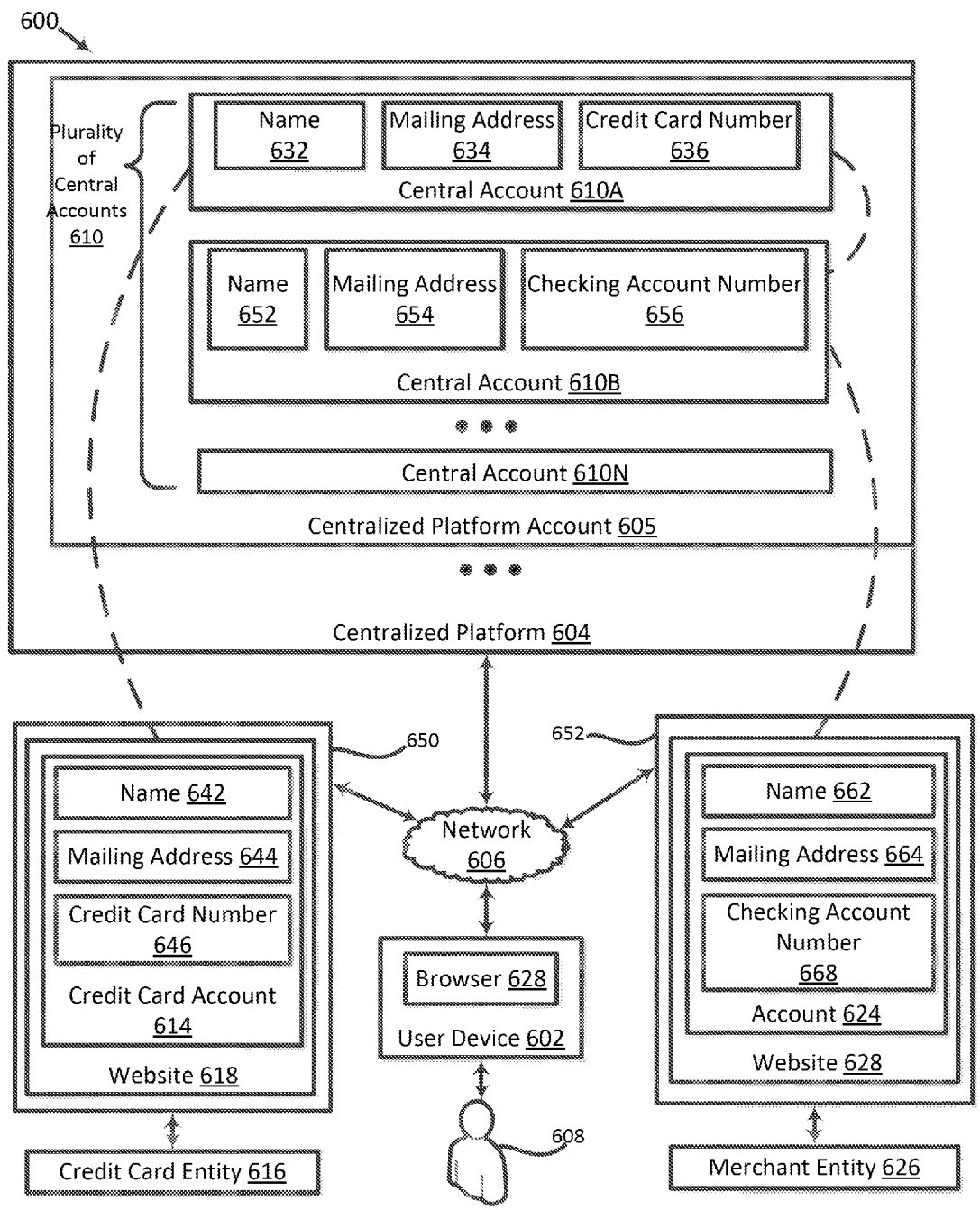
FIG. 6 is a block diagram illustrating an embodiment of a networked system for publishing the user's updated account information to one or more third-party entities.

FIG. 6 is a block diagram illustrating an embodiment of a networked system 600 for publishing the user's updated account information to one or more third-party entities. Networked system 600 may include or implement a plurality of servers and/or software components that operate to perform various transactions or processes. Example servers may include stand-alone and enterprise-class servers operating a server operating system (OS) such as a MICROSOFT® OS, a UNIX® OS, a LINUX® OS, or other suitable server-based OS. It can be appreciated that a server illustrated in FIG. 6 may be deployed in other ways and that the operations performed and/or the services provided by such a server may be combined or separated for a given implementation and may be performed by a greater number of servers. One or more servers may be operated and/or maintained by the same or different entities.

The embodiment of the networked system 600 illustrated in FIG. 6 includes one or more user devices 602, centralized platform 604, web server 650, and web server 652 in communication over a network 606. In some examples, first user credentials are used to authenticate the user at the website maintained by centralized platform 604, second user credentials are used to authenticate the user at web site 618 maintained by credit card entity 616, and third user credentials are used to authenticate the user at website 628 maintained by merchant entity 626. The first user credentials, second user credentials, and/or third user credentials may be different from each other.

User device 602 is remote from and communicates with centralized platform 604 over network 606 using a browser 628. Web server 650 hosts website 618, and web server 652 hosts website 628. User device 602, centralized platform 604, web server 650, and web server 652 may each include one or more processors, memories, and other appropriate components for executing instructions such as program code and/or data stored on one or more computer readable mediums to implement the various applications, data, and actions described herein. For example, such instructions may be stored in one or more computer readable media such as memories or data storage devices internal and/or external to various components of system 600, and/or accessible over network 606. Network 606 may be implemented as a single network or a combination of multiple networks. For example, in various embodiments, network 606 may include the Internet or one or more intranets, landline networks, wireless networks, and/or other appropriate types of networks.

User device 602 may be implemented using any appropriate hardware and software configured for wired and/or wireless communication over network 606. For example, in one embodiment, the user device may be implemented as a personal computer (PC), a smart phone, wearable device, laptop computer, and/or other types of computing devices capable of transmitting and/or receiving data, such as an iPad™ from Apple™ or an Android smartphone. Trademarks are the property of their respective owners.

User device 602 may include one or more browser applications which may be used, for example, to provide a convenient interface to permit the user to browse information available over the network 606. For example, in one embodiment, the browser application may be implemented as a web browser configured to view information available over the Internet. User device 602 may also include one or more toolbar applications which may be used, for example, to provide user-side processing for performing desired tasks in response to operations selected by the user. In one embodiment, the toolbar application may display a user interface in connection with the browser application.

A user 608 may access centralized platform 604 using browser 628. Centralized platform 604 may be accessible via a uniform resource locator (URL) to which browser 628 executing on user device 602 points. In an example, centralized platform 604 is provided via a mobile application installed on user device 602. User device 602 may further include other applications as may be desired in particular embodiments to provide desired features to the user device. For example, the other applications may include security applications for implementing user-side security features, programmatic user applications for interfacing with appropriate application programming interfaces (APIs) over network 606, or other types of applications. Email and/or text applications may also be included, which allow the user to send and receive emails and/or text messages through network 606. User device 602 may include one or more user and/or device identifiers which may be implemented, for example, as operating system registry entries, cookies associated with the browser application, identifiers associated with hardware of the user device, or other appropriate identifiers, such as a phone number. In one embodiment, the user identifier may be used by the centralized platform 604 and/or the websites 618 and/or 628 to associate the user with a particular account as described herein.

Centralized platform 604 stores a user's centralized platform account 605, which includes a plurality of central accounts 610 including central account 610A, central account 610B, . . . , and central account 610N. Each central account of plurality of central accounts 610 may correspond with a third-party account that the user has with an entity. A user's central account corresponds with a third-party account that the user has with an entity if the central account is based on (or should mirror) the information in the third-party account. Central account 610A may correspond with a credit card account 614 that user 608 has with a credit card entity 616.

Central account 610A includes a name field 632, a mailing address field 634, a credit card number field 636, and may include other fields. User 608 may access credit card account 614 through a website 618, which may be maintained by credit card entity 616. Credit card account 614 includes a name field 642, a mailing address field 644, a credit card number field 646, and may include other fields. As indicated by the dashed lines, the account information in central account 610A corresponds with credit card account 614. For example, a first field (e.g., mailing address field 634) in central account 610A may correspond with a second field (e.g., mailing address field 644) in credit card account 614. In such an example, if the first field in central account 610A is updated then the second field in credit card account 614 should also be updated with the same value. Similarly, if the second field in credit card account 614 is updated then the first field in central account 610A should also be updated with the same value.

As indicated by the dashed lines, central account 610B corresponds with a third-party account 624 that user 608 has with a merchant entity 626. Central account 610B includes a name field 652, a mailing address field 654, a checking account number field 656, and may include other fields. User 608 may access account 624 through a website 628, which may be maintained by merchant entity 626. Account 624 includes a name field 662, a mailing address field 664, a checking account number field 668, and may include other fields. The account information in central account 610B corresponds with third-party account 624. For example, a first field (e.g., mailing address field 654) in central account 610B may correspond with a second field (e.g., mailing address field 664) in account 624. In such an example, if the first field in central account 610B is updated then the second field in account 624 should also be updated with the same value. Similarly, if the second field in account 624 is updated then the first field in central account 610B should also be updated with the same value. Additionally, as illustrated in FIG. 6 by the dashed lines, central account 610A is linked with central account 610B.

It should be understood that merchant entity 626 may be any entity that stores user profile information about user 608 or that receives money, which includes charities as well as retailers and restaurants, from a funding source associated with the user. For example, a purchase transaction may be a donation to charity. In another example, merchant entity 626 may be a government entity with which the user has an account. For example, merchant entity 626 may be the United States Postal Service (USPS), and the user may open an account with the USPS and provide her mailing address along with other information to the USPS. Merchant entity 626 is different from credit card entity 616, and each of these entities separately maintains and updates its own account that it has with user 608.

Figure 7:
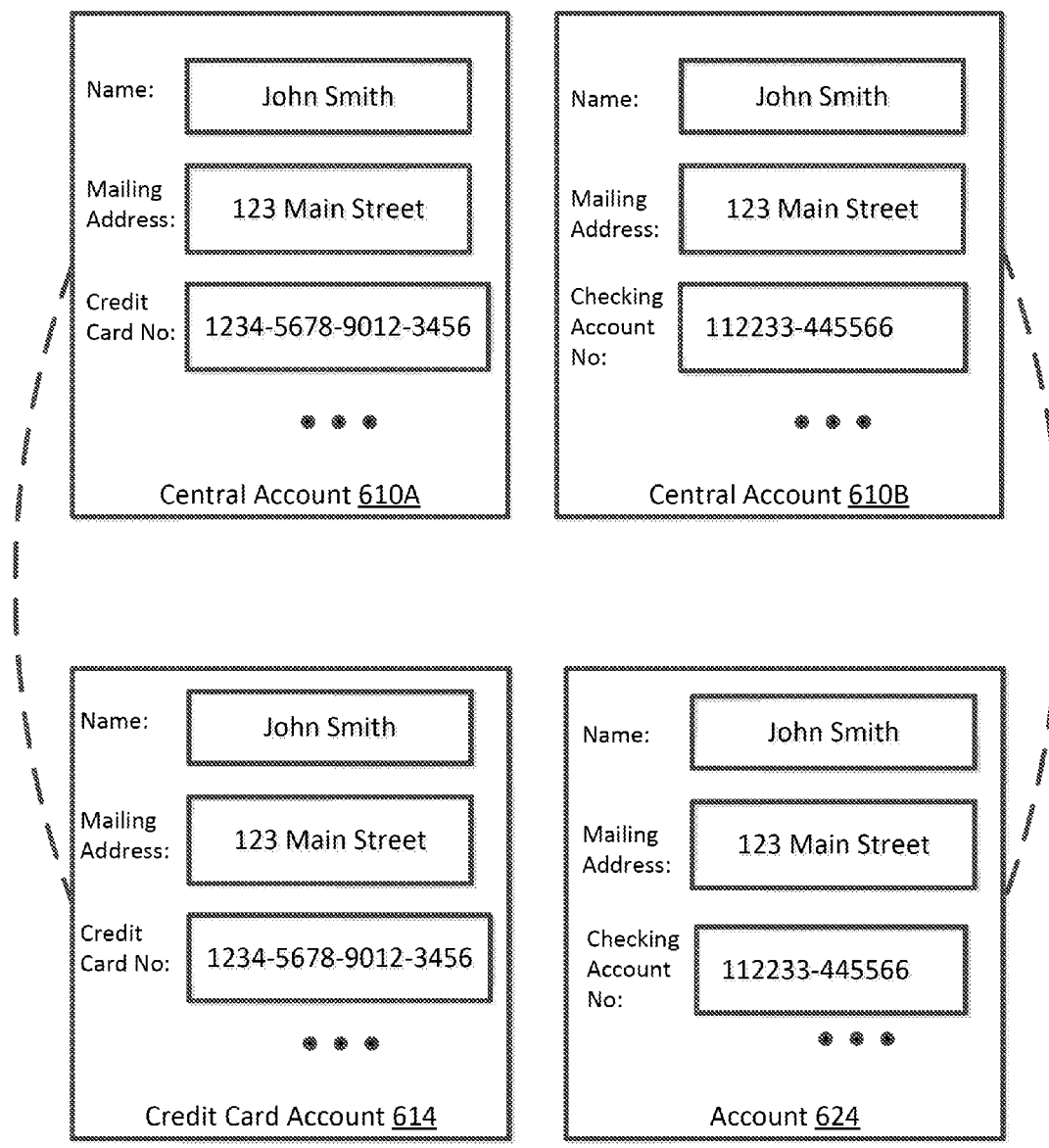
FIG. 7 is a block diagram illustrating an embodiment of central accounts corresponding with third-party accounts that the user has with entities.

FIG. 7 is a block diagram illustrating an embodiment of central accounts corresponding with third-party accounts that the user has with entities. In FIG. 7, central account 610A includes user 608's name "John Smith," mailing address "123 Main Street," and credit card number "1234-5678-0912-3456" and corresponds with credit card account 614, which is maintained by credit card entity 616. Credit card account 614 includes user 608's name "John Smith," mailing address "123 Main Street," and credit card number "1234-5678-0912-3456" and corresponds with central account 610A. The account information in central account 610A and credit card account 614 should mirror each other. It should be understood that central account 610A may include less information than that in credit card account 614. Additionally, if any of the fields in credit card account 614 are modified, the field in central account 610A corresponding with the modified field in credit card account 614 should also be modified. Similarly, if any of the fields in central account 610A are modified, the field in credit card account 614 corresponding to the modified field in central account 610A should also be modified.

Central account 610B includes user 608's name "John Smith," mailing address "123 Main Street," and checking account number "112233-445566" and corresponds with account 624, which is maintained by merchant entity 626. Account 624 also includes user 608's name "John Smith," mailing address "123 Main Street," and checking account number "112233-445566" and corresponds with central account 610B. Central account 610B corresponds with third-party account 624. It should be understood that central account 610B may include less information than that in account 624. Additionally, if any of the fields in account 624 are modified, the field in central account 610B corresponding to the modified field in account 624 should also be modified. Similarly, if any of the fields in central account 610B are modified, the field in account 624 corresponding to the modified field in central account 610B should also be modified.

IV. Example Process Flow

Figure 8:
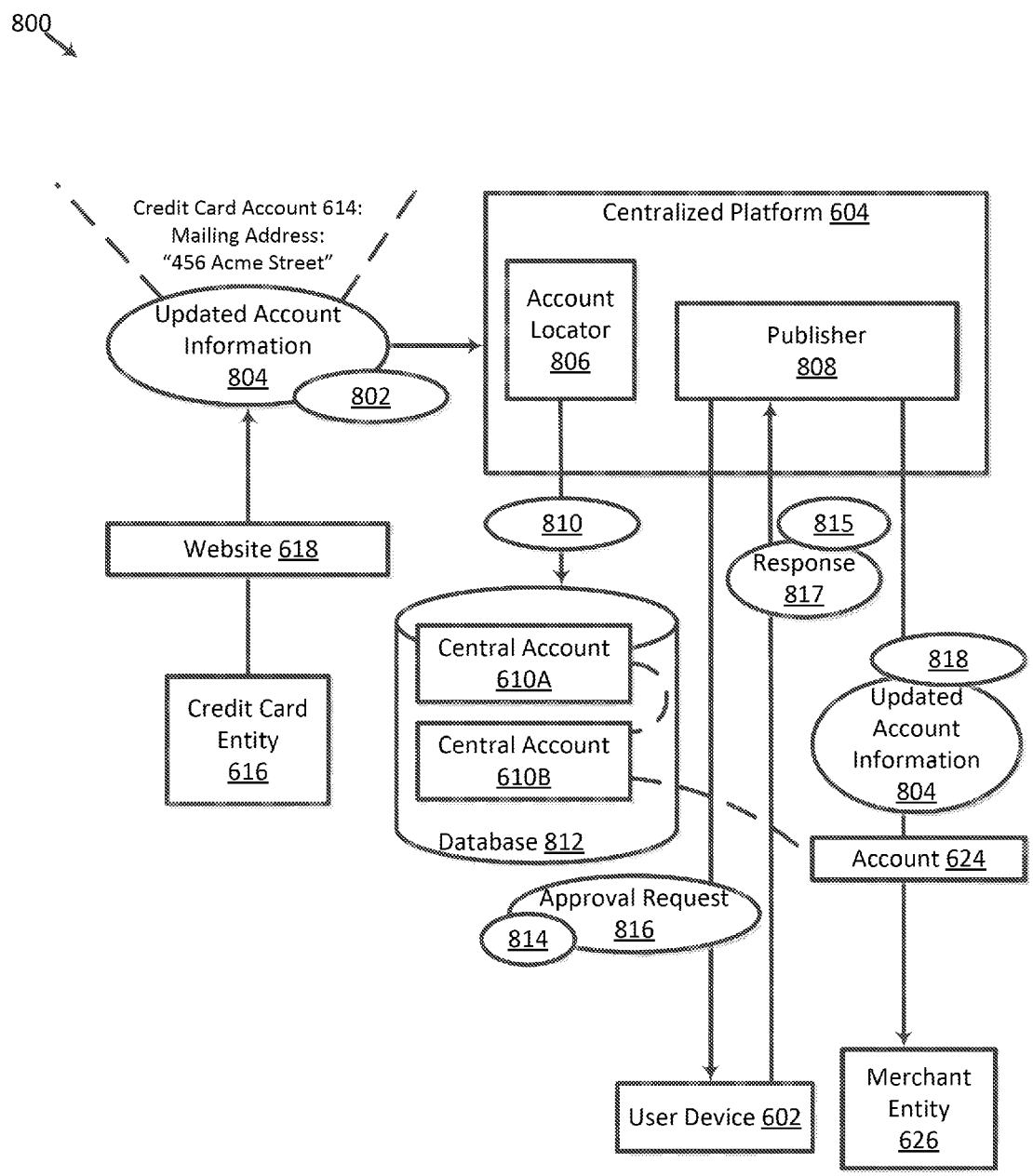
FIG. 8 is a block diagram illustrating of an embodiment of a process flow for publishing the user's updated account information to one or more third-party entities.

FIG. 8 is a block diagram illustrating an embodiment of a process flow 800 for publishing the user's updated account information to one or more third-party entities. FIGS. 6-8 are discussed below in relation to each other to better explain the process flow. In FIG. 8, at an action 802, centralized platform 604 receives a user's updated account information 804, which includes an update to one or more fields of a user's central account. In particular, updated account information 804 is an update to user 608's mailing address that the user made in credit card account 614 with credit card entity 616. In this example, user 608 may have logged into her account with credit card entity 616 via website 618 and modified her mailing address in credit card account 614. In the example illustrated in FIG. 8, website 618, which is maintained by credit card entity 616, provides updated account information 804 associated with credit card account 614 to centralized platform 604. It should be understood that user 608 may provide updated account information 804 directly to centralized platform 604 (see FIG. 2 and FIG. 3).

Centralized platform 604 includes an account locator 806 and a publisher 808 and is coupled to a database 812. Database 812 stores one or more centralized platform accounts of one or more users. At an action 810, account locator 806 searches database 812 for a central account corresponding with credit card 614. Account locator 806 may identify central account 610A as corresponding with credit card 614 and in particular with updated account information 804. Central account 610A corresponds with updated account information 804 if the central account includes one or more fields that are updated by updated account information 804. In this example, account locator 806 may identify central account 610A and update the mailing address field of the central account to "456 Acme Street."

Account locator 806 may search database 812 for a set of central accounts of plurality of accounts 610 that is linked with central account 610A or to the field (e.g., mailing address field) to be updated by updated account information 804. As illustrated in FIG. 6 and FIG. 8 by the dashed lines, central account 610A is linked with central account 610B. Centralized platform 604 or user 608 may have linked these two central accounts together. In an example, central account 610A and central account 610B are linked because they both include the "mailing address" field. In another example, the "mailing address" field is linked with central account 610A and central account 610B.

Figure 9:
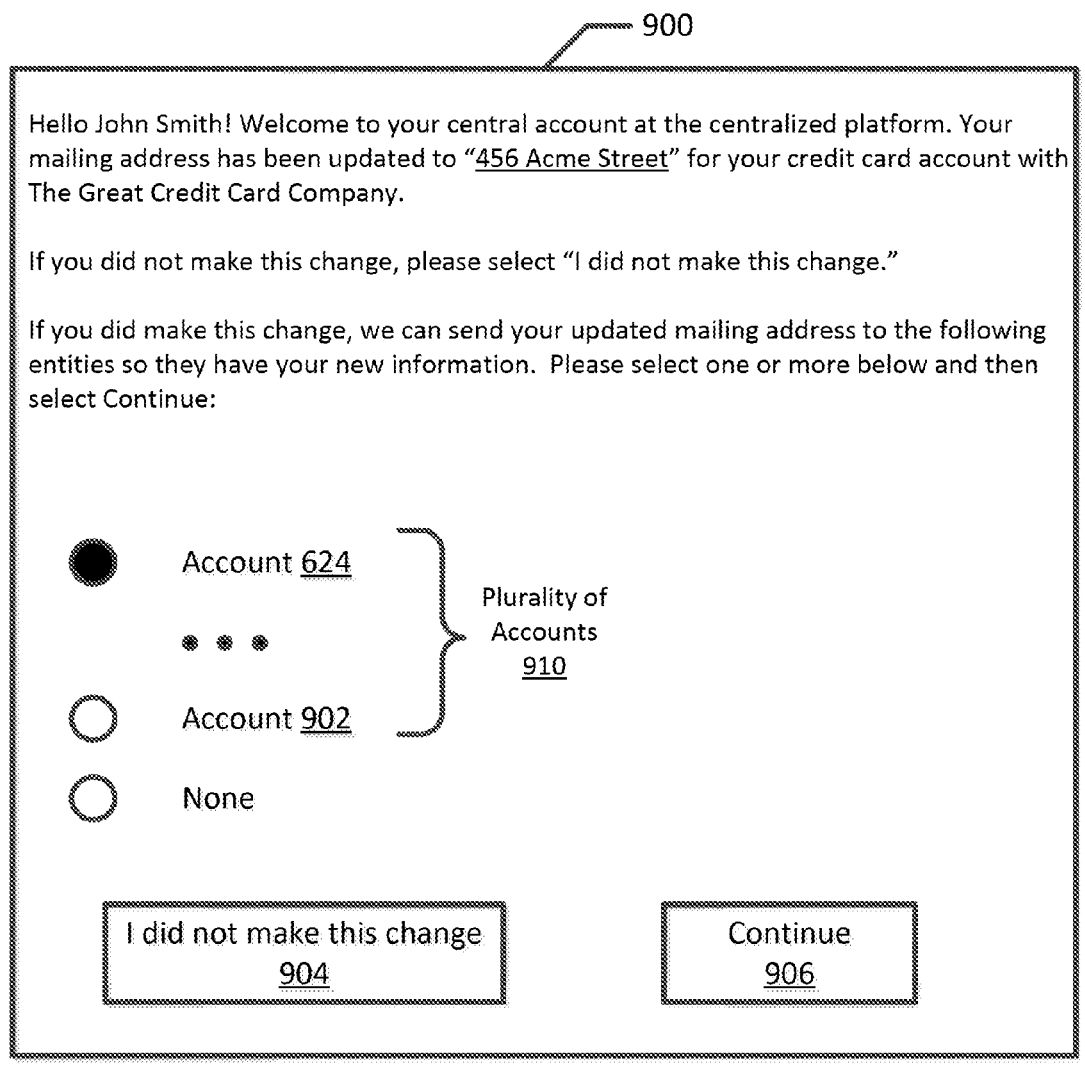
FIG. 9 is an embodiment of a webpage that is provided by the centralized platform to the user to request the user's approval of publishing updated account information to one or more third-party entities.

Account locator 806 may then identify a third-party account of the user corresponding with central account 610B. As illustrated in FIG. 6 and FIG. 8 by the dashed lines, central account 610B corresponds with account 624. Accordingly, both central account 610B at centralized platform 604 and account 624 at website 628 may be updated by updated account information 804. At an action 814, publisher 808 sends an approval request 816 to user device 602. Approval request 816 is a request for the user's approval of updated account information 804 being published to one or more third-party entities. FIG. 9 is an embodiment of a webpage 900 that is provided by the centralized platform to the user to request the user's approval of publishing updated account information 804 to one or more third-party entities. Webpage 900 includes a user selectable option "I did not make this change" 904 that if selected by the user, indicates to centralized platform 604 potential fraud on the user's account. By selecting user selectable option "I did not make this change" 904, the user is informing centralized platform 604 that she did not make the change to her mailing address. Centralized platform 604 may propagate this fraud alert to credit card entity 616 from which updated account information 804 was made. Additionally, centralized platform 604 may flag the user's account as being compromised and be high alert for suspicious activity. Centralized platform 604 may send the user a fraud alert in a variety of ways. For example, centralized platform 604 may send a fraud alert via e-mail to the user's e-mail address, via text message to the user's cellular telephone, or via a telephone call to the user's phone to inform the user of the potential fraud.

The user may select one or more radio buttons corresponding to one or more accounts of a plurality of accounts 910 and press a user selectable option "Continue" 906. Webpage 900 includes user selectable option "Continue" 906 that if selected by the user, indicates to centralized platform 604 that the user approves of centralized platform 604 publishing updated account information 804 to the third-party entities that maintain the accounts selected by the user. Each of the third-party accounts selectable by the user may include the field to be updated by updated account information 804. In an example, the user may select all of the third-party accounts listed on webpage 900. In another example, the user may select a subset of the third-party accounts listed on webpage 900. The user may select a subset of the listed accounts if she does not want all of the third-party accounts listed on webpage 900 to be updated with her "new" mailing address. For example, the user may buy an expensive item and wish for the item to be mailed to her work address rather than her residential address for security purposes. In such an example, the user may purchase an item with merchant entity 626 via website 628, modify the mailing address in her account 624 to be her work address, and request that the item be mailed to her work address. The user may not want any items other than the one she just bought from merchant entity 626 to be mailed to her work address. In this example, the user may select the radio button corresponding to "None" on webpage 900 and select user selectable option "Continue" 906.

Referring back to FIG. 8, at an action 815, user device 602 sends a response 817 to centralized platform 604. Response 817 is responsive to approval request 816 and indicates whether the user approves of the updated account information being published to other entities. Centralized platform 604 may receive response 817. At an action 818, in response to a determination that user 608 has approved of updated account information 804 being published to one or more third-party entities, publisher 808 publishes updated account information 804 to the one or more third-party entities (e.g., merchant entity 626). The entities that receive the published account information are those that maintain accounts selected on webpage 900 by the user or correspond with central accounts linked with central account 610A. Accordingly, the user may provide the updated account information to an entity once (e.g., to centralized platform 604 or credit card entity 616) and the updated account information may be streamlined and published to one or more third-party entities by centralized platform 604. The third-party entities may update their record of the user's account with the updated account information. It may be unnecessary for the user to update her new account information with each of these third-party entities. It should be understood that updated account information 804 may be any information that may be added to a user's account. In an example, updated account information 804 is a new credit card number that has been provided to the user by credit card entity 616 or another credit card company.

V. Example Computing Systems

Figure 10:
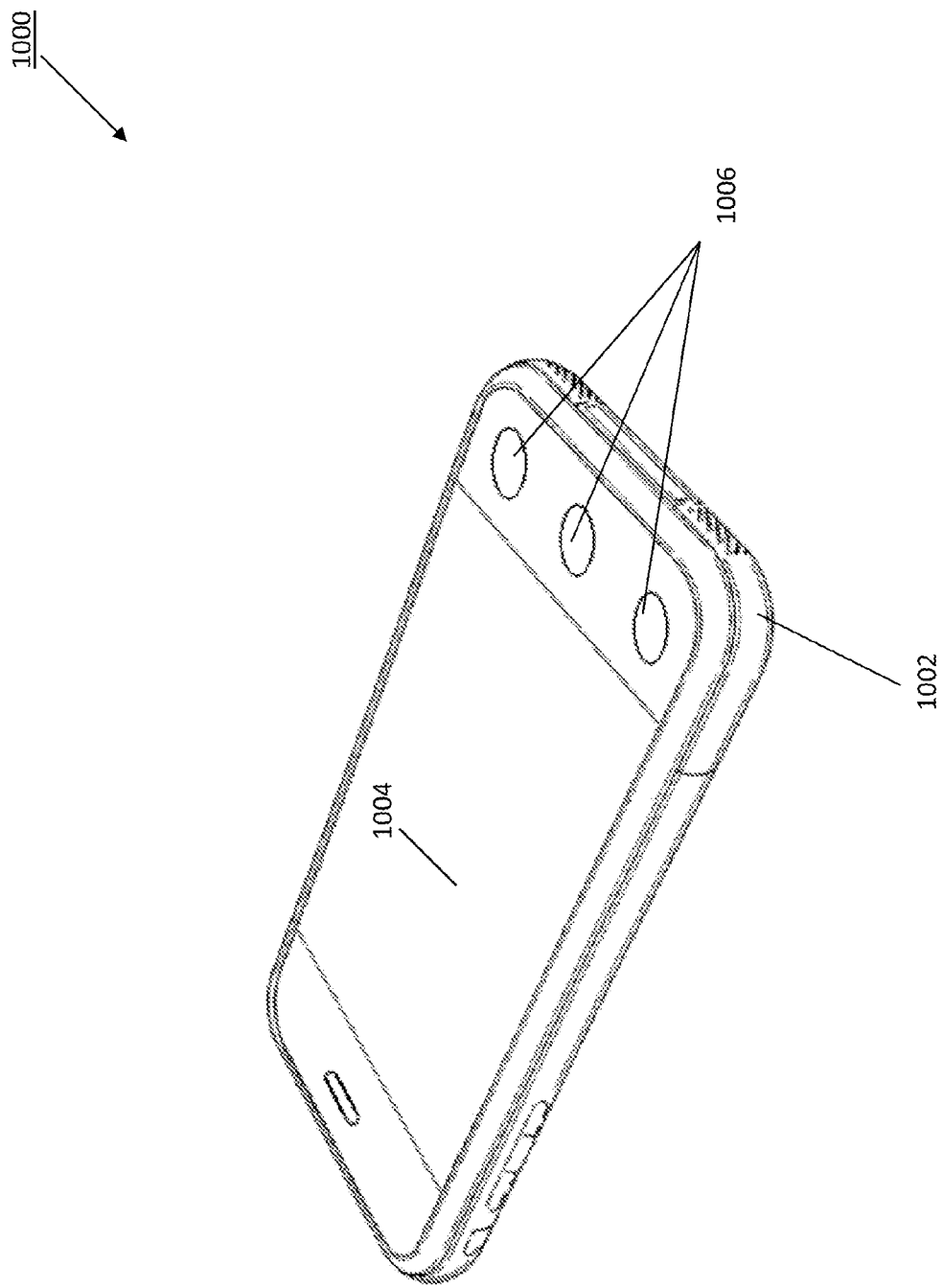
FIG. 10 is a perspective view illustrating an embodiment of a user device.

Referring now to FIG. 10, an embodiment of a user device 1000 is illustrated. The user device 1000 may be any of the user devices discussed above. The user device 1000 includes a chassis 1002 having a display 1004 and an input device including the display 1004 and a plurality of input buttons 1006. One of skill in the art will recognize that the user device 1000 is a portable or mobile phone including a touch screen input device and a plurality of input buttons that allow the functionality discussed above. For example, the user may use user device 1000 to modify her central account with centralized platform 604 or to modify her account with an entity via its website. However, a variety of other portable/mobile user devices and/or desktop user devices may be used in the methods and/or process flows discussed above with reference to FIG. 1 and FIG. 8 without departing from the scope of the present disclosure.

Figure 11:
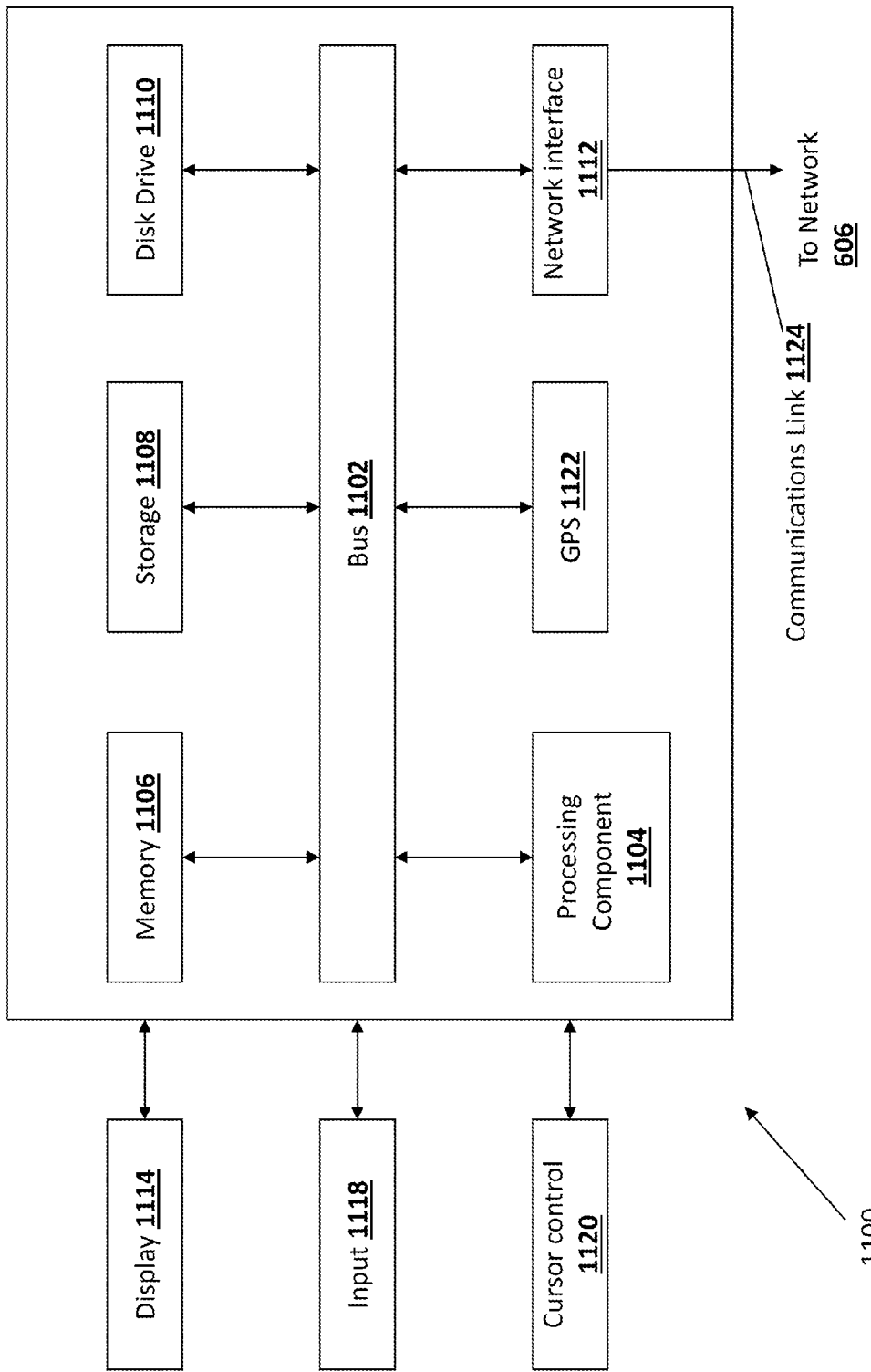
FIG. 11 is a schematic view illustrating an embodiment of a computer system.

Referring now to FIG. 11, an embodiment of a computer system 1100 suitable for implementing, for example, the user devices, the web servers, and/or the centralized platform is illustrated. It should be appreciated that other devices utilized by users, merchants, account providers, and/or system providers in the system discussed above may be implemented as the computer system 1100 in a manner as follows.

In accordance with various embodiments of the present disclosure, computer system 1100, such as a computer and/or a network server, includes a bus 1102 or other communication mechanism for communicating information, which interconnects subsystems and components, such as a processing component 1104 (e.g., processor, micro-controller, digital signal processor (DSP), etc.), a system memory component 1106 (e.g., RAM), a static storage component 1108 (e.g., ROM), a disk drive component 1110 (e.g., magnetic or optical), a network interface component 1112 (e.g., modem or Ethernet card), a display component 1114 (e.g., CRT or LCD), an input component 1118 (e.g., keyboard, keypad, or virtual keyboard), a cursor control component 1120 (e.g., mouse, pointer, or trackball), and/or a location determination component 1122 (e.g., a Global Positioning System (GPS) device as illustrated, a cell tower triangulation device, and/or a variety of other location determination devices known in the art.) In one implementation, the disk drive component 1110 may include a database having one or more disk drive components.

In accordance with embodiments of the present disclosure, the computer system 1100 performs specific operations by the processing component 1104 executing one or more sequences of instructions contained in the memory component 1106, such as described herein with respect to the user devices, the merchant devices, the account provider devices, and/or the system provider device. Such instructions may be read into the system memory component 1106 from another computer readable medium, such as the static storage component 1108 or the disk drive component 1110. In other embodiments, hard-wired circuitry may be used in place of or in combination with software instructions to implement the present disclosure.

Logic may be encoded in a computer readable medium, which may refer to any medium that participates in providing instructions to the processor 1104 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1110, volatile media includes dynamic memory, such as the system memory component 1106, and transmission media includes coaxial cables, copper wire, and fiber optics, including wires that include the bus 1102. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In some embodiments, the computer readable media is non-transitory.

In various embodiments of the present disclosure, execution of instruction sequences to practice the present disclosure may be performed by the computer system 1100. In various other embodiments of the present disclosure, a plurality of the computer systems 1100 coupled by a communication link 1124 to network 606 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1100 may transmit and receive messages, data, information and instructions, including one or more programs (i.e., application code) through the communication link 1124 and the network interface component 1112. The network interface component 1112 may include an antenna, either separate or integrated, to enable transmission and reception via the communication link 1124. Received program code may be executed by processing component 1104 as received and/or stored in disk drive component 1110 or some other non-volatile storage component for execution.

Figure 12:
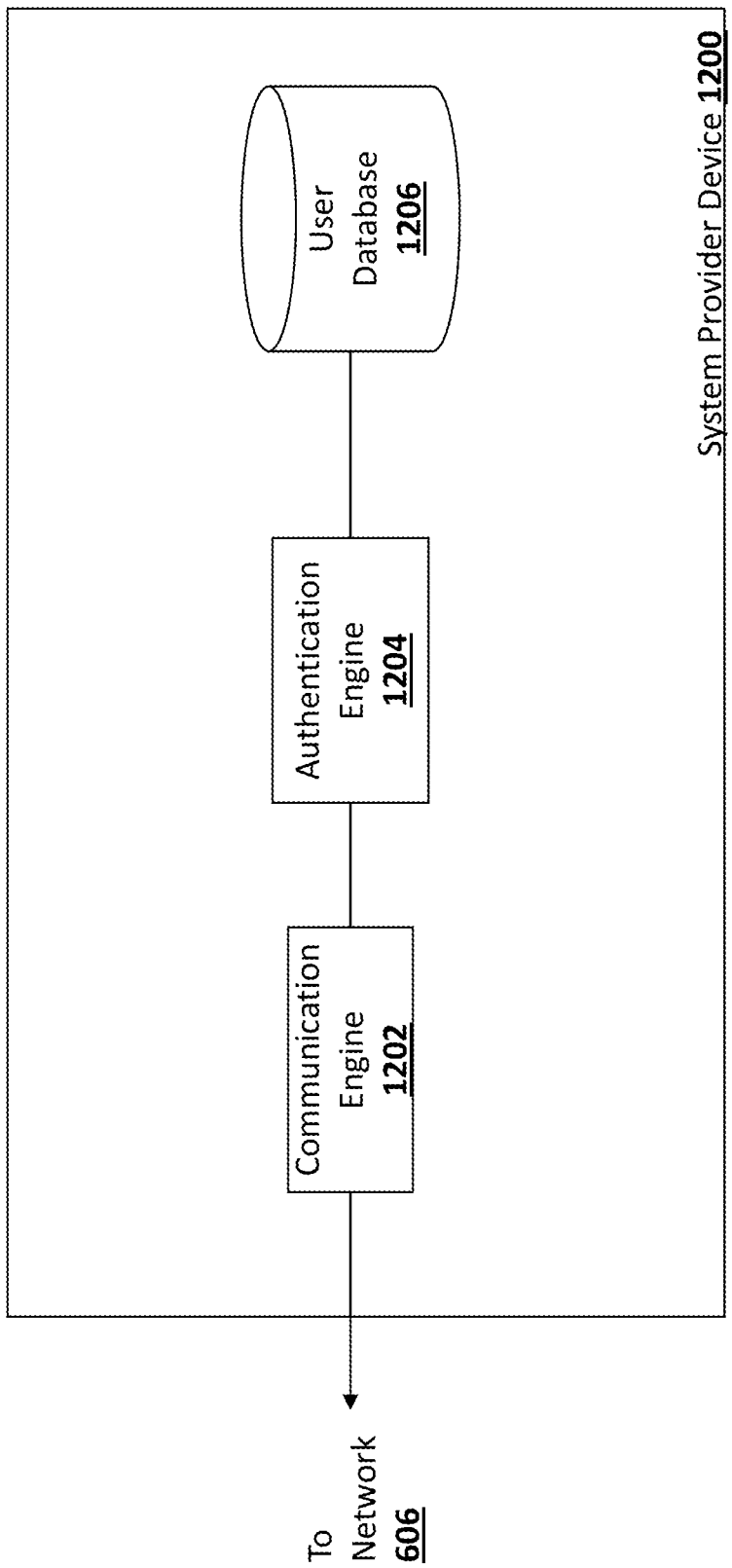
FIG. 12 is a schematic view illustrating an embodiment of a system provider device.

Referring now to FIG. 12, an embodiment of a system provider device 1200 is illustrated. In an embodiment, the device 1200 may be the user devices, the merchant devices, the account provider devices, and/or the system provider device discussed above. The device 1200 includes a communication engine 1202 that is coupled to the network 606 and to an authentication engine 1204 that is coupled to a user database 1206. The communication engine 1202 may be software or instructions stored on a computer-readable medium that allows the device 1200 to send and receive information over the network 606. The authentication engine 1204 may be software or instructions stored on a computer-readable medium that is operable to provide any of the other functionality that is discussed above. While the database 1206 has been illustrated as located in the device 1200, one of skill in the art will recognize that it may be connected to the authentication engine 1204 through the network 606 without departing from the scope of the present disclosure.

In some examples, the communication engine 1202 receives a user's user credentials and authentication engine 1204 determines whether to authenticate the user. Authentication engine 1204 may search the user database 1206 to determine whether to authenticate the user. For example, if the communication engine 1202 receives a username and password, the authentication engine 1204 may search user database 1206 for the username and password. If the username and password are found in the user database 1206, the authentication engine 1204 may successfully authenticate the user. In contrast, if the username and password are not found in the user database 1206, the authentication engine 1204 may prevent the user from logging in and request that the user re-enter the user credentials.

Where applicable, various embodiments provided by the present disclosure may be implemented using hardware, software, or combinations of hardware and software. Also, where applicable, the various hardware components and/or software components set forth herein may be combined into composite components including software, hardware, and/or both without departing from the scope of the present disclosure. Where applicable, the various hardware components and/or software components set forth herein may be separated into sub-components including software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A centralized platform system for publishing a user's updated account information to one or more entities, comprising:
    a non-transitory memory storing a centralized platform account of a user, wherein the centralized platform account includes a plurality of central accounts of the user, and each central account of the plurality of central accounts corresponds with a third-party account that the user has with a respective entity; and
    one or more hardware processors coupled to the non-transitory memory and configured to execute instructions to cause the system to perform operations comprising:
        identifying the centralized platform account of the user, wherein the centralized platform account is managed by a first entity;
        making available a set of application programming interfaces (APIs) that allows a second entity website of a second entity to access a first central account that corresponds with the second entity;
        receiving, via at least one invoked API of the set of APIs, first account information associated with the first central account of the plurality of central accounts, wherein the first central account corresponds with a first third-party account managed by the second entity;
        replacing second account information in the first central account with the first account information;
        searching a database for a second central account of the plurality of central accounts, wherein the second central account includes the second account information and corresponds with a second third-party account managed by a third entity that is different from the first and second entities;
        replacing the second account information in the second central account with the first account information while maintaining the first account information in the first central account; and
        publishing the first account information to the second third-party account managed by the third entity.

2. The centralized platform system of claim 1, wherein first user credentials are used to authenticate the user at a website of the first entity and second user credentials are used to authenticate the user at a website of the second entity, and wherein the first user credentials are different from the second user credentials.

3. The centralized platform system of claim 2, wherein the website of the first entity and the website of the second entity are merchant websites.

4. The centralized platform system of claim 1, wherein the second entity is a source of truth for the first account information, and wherein publishing the first account information includes publishing the first account information to a website of the third entity.

5. The centralized platform system of claim 1, wherein the third entity is a source of truth for one or more fields in the second central account.

6. The centralized platform system of claim 1, wherein the operations further comprise:
    receiving a request to link a field with the first and second central accounts; and
    in response to the request, linking the field with the first and second central accounts, wherein the first account information updates the field in the first central account, and wherein searching the database includes searching for one or more central accounts linked with the field.

7. The centralized platform system of claim 1, wherein the operations further comprise:
    receiving a request to link the first central account with the second central account; and
    in response to the request, linking the first central account with the second central account, wherein searching the database includes searching for one or more central accounts linked with the first central account.

8. The centralized platform system of claim 1, wherein the operations further comprise:
    sending a request for approval of the publishing of the first account Information to a user device associated with the user, wherein publishing the first account information is in response to a determination that the first account information has been approved for publishing to the third entity.

9. The centralized platform system of claim 8, wherein the replacing the second account information in the second central account with the first account information is in response to receiving a confirmation that the first account information has replaced the second account information in the second third-party account.

10. The centralized platform system of claim 1, wherein the first account information includes at least one of credit card information, bank account information, a telephone number, an e-mail address, or a mailing address of the user.

11. A method of publishing a user's updated account information to one or more entities, comprising:
    identifying a centralized platform account of a user, wherein the centralized platform account is managed by a first entity and includes a plurality of central accounts of the user, and wherein each central account of the plurality of central accounts corresponds with a third-party account that the user has with a respective entity;
    making available a set of application programming interfaces (APIs) that allows a second entity website of a second entity to access a first central account that corresponds with the second entity;

receiving first account information associated with the first central account of the plurality of central accounts, wherein the first central account corresponds with a first third-party account managed by the second entity;

replacing second account information in the first central account with the first account information;

searching a database for a set of central accounts of the plurality of central accounts, wherein the set of central accounts includes the second account information and corresponds with one or more third-party accounts managed by one or more entities different from the first and second entities;

replacing the second account information in a second central account of the set of central accounts with the first account information while maintaining the first account information in the first central account, wherein the second central account corresponds with a second third-party account of the one or more third-party accounts managed by a third entity of the one or more entities different from the first entity and the second entity; and publishing the first account information to the one or more third-party accounts managed by the one or more entities.

12. The method of claim 11, further comprising:
receiving a request to link a field with the first central account and the set of central accounts; and
in response to the request, linking the field with the first central account and the set of central accounts, wherein the first account information updates the field in the first central account, and wherein searching the database includes searching for one or more central accounts linked with the field.

13. The method of claim 11, further comprising:
receiving a request to link the first central account with the set of central accounts; and
in response to the request, linking the first central account with the set of central accounts, wherein searching the database includes searching for one or more central accounts linked with the first central account.

14. The method of claim 11, further comprising:
sending a request for approval of the publishing of the first account information to a user device associated with the user.

15. The method of claim 14, wherein publishing the first account information is in response to a determination that the first account information has been approved for publishing to the one or more entities.

16. The method of claim 14, wherein in response to a determination that the first account information has not been approved for publishing to the one or more entities, the first account information is not published to the one or more entities.

17. The method of claim 14, wherein the replacing the second account information in the second central account with the first account information, is in response to receiving a confirmation from the third entity that the second third-party account has been updated with the first account information.

18. The method of claim 17, further comprising:
receiving a second confirmation from a fourth entity of the one or more entities that a third third-party account of the one or more third-party accounts has been updated with the first account information; and
in response to receiving the second confirmation, replacing the second account information in a third central account with the first account information, wherein the third central account corresponds with the third third-party account managed by the fourth entity.

19. A non-transitory machine-readable medium comprising a plurality of machine-readable instructions which, when executed by one or more processors, are adapted to cause the one or more processors to perform a method comprising:
identifying a centralized platform account of a user, wherein the centralized platform account is managed by a first entity and includes a plurality of central accounts of the user, and wherein each central account of the plurality of central accounts corresponds with an account that the user has with a respective entity;
making available a set of application programming interfaces (APIs) that allows a second entity website of a second entity to access a first central account that corresponds with the second entity;
receiving, via at least one invoked API of the set of APIs, first account information associated with the first central account of the plurality of central accounts, wherein the first central account corresponds with a first third-party account managed by the second entity;
replacing second account information in the first central account with the first account information;
searching a database for a second central account of the plurality of central accounts, wherein the second central account includes the second account information and corresponds with a second third-party account managed by a third entity that is different from the first and second entities;
replacing the second account information in the second central account with the first account information while maintaining the first account information in the first central account; and
publishing the first account information to the second third-party account managed by the third entity.

20. The non-transitory machine-readable medium of claim 19, wherein the replacing the second account information in the second central account with the first account information is in response to receiving a confirmation that the first account information has replaced the second account information in the second third-party account.

* * * * *